(12) United States Patent
Takushima et al.

(10) Patent No.: US 7,016,570 B2
(45) Date of Patent: Mar. 21, 2006

(54) OPTICAL SIGNAL PROCESSOR

(75) Inventors: Michiko Takushima, Yokohama (JP); Tomomi Sano, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 51 days.

(21) Appl. No.: 10/692,805

(22) Filed: Oct. 27, 2003

(65) Prior Publication Data

US 2004/0136654 A1    Jul. 15, 2004

Related U.S. Application Data

(63) Continuation-in-part of application No. PCT/JP03/01588, filed on Feb. 14, 2003.

(30) Foreign Application Priority Data

Feb. 27, 2002    (JP)    ............... P2002-052011

(51) Int. Cl.
G02B 6/34    (2006.01)
(52) U.S. Cl. ............................................. 385/37
(58) Field of Classification Search ................. 385/31, 385/37, 11
See application file for complete search history.

(56) References Cited

U.S. PATENT DOCUMENTS 4,496,518 A * 1/1985 Marie ........................... 376/104
6,075,596 A * 6/2000 Pan et al. ..................... 356/477

FOREIGN PATENT DOCUMENTS

| JP | 59-60408 | 4/1984 |
|----|----------|--------|
| JP | 59-60408 A | 4/1984 |
| JP | 02-159528 | 6/1990 |
| JP | 2-159528 A | 6/1990 |
| JP | 05-100114 | 4/1993 |
| JP | 5-100114 A | 4/1993 |
| JP | 05-215918 | 8/1993 |
| JP | 5-215918 A | 8/1993 |
| JP | 07-151982 | 6/1995 |
| JP | 7-151982 A | 6/1995 |
| JP | 2001-4447 A | 1/2001 |
| JP | P2001-4447 | 1/2001 |
| JP | 2002-323374 A | 11/2002 |
| JP | P2002-323374 | 11/2002 |

* cited by examiner

*Primary Examiner*—Sarah Song
(74) *Attorney, Agent, or Firm*—McDermott Will & Emery LLP

(57) ABSTRACT

An optical signal processor comprises fiber collimators, a first diffraction grating device, a second diffraction grating device, a first half-wave plate, and a second half-wave plate. Each of the diffraction grating devices is of reflection type having a diffracting surface parallel to a yz plane and a grating direction parallel to a z axis. The diffraction grating device diffracts the light outputted from the fiber collimator after collimation. The diffraction grating device diffracts the light diffracted by the diffraction grating device. The half-wave plates having respective optic axes in directions different from each other by 45 degrees are bonded together and are disposed on an optical path between the diffraction grating devices.

10 Claims, 6 Drawing Sheets

OPTICAL SIGNAL PROCESSOR

CROSS-REFERENCE TO RELATED APPLICATION

This is a Continuation-In-Part application of International Patent application serial No. PCT/JP03/01588 filed on Feb. 14, 2003, now pending.

BACKGROUND OF THE INVENTION

1. Field of the Invention

The present invention relates to an optical signal processor including a diffraction grating device.

2. Related Background Art

As an optical signal processor including a diffraction grating device, one disclosed in Japanese Patent Application Laid-Open No. 2001-4447 has been known for example. The optical signal processor disclosed in the publication intends to demultiplex light with an excellent wavelength resolution by causing a diffraction grating device to diffract the light twice. By propagating light in the direction opposite from that at the time of demultiplexing, the optical signal processor can also multiplex the inputted light having a certain wavelength region and output thus multiplexed light.

Meanwhile, the state of polarization of light varies as characteristics of the optical transmission line fluctuate upon changes in environments and the like, whereby the light to be fed into and processed by the optical signal processor does not always have a constant state of polarization. Therefore, it is desirable for the processing of light in the optical signal processor to be less dependent on the state of polarization of input light. However, the efficiency of light diffraction in diffraction grating devices has been known to vary depending on the polarization direction of incident light.

For overcoming such a problem, the optical signal processor disclosed in the above-mentioned publication disposes a half-wave plate on the optical path between the first and second diffracting actions caused by the diffraction grating device. The half-wave plate has an optic axis in a direction parallel to a plane perpendicular to the optical axis of incident light. When linearly polarized light having a polarization direction inclined by an angle θ with respect to the optic axis is incident on the half-wave plate, the polarization direction of the light is rotated by an angle 2θ, and the light is emitted as linearly polarized light having a polarization direction inclined by an angle (−θ) with respect to the optic axis. If the angle θ is 45 degrees, the half-wave plate can output the incident linearly polarized light as linearly polarized light having a direction orthogonal thereto. By utilizing such an effect of the half-wave plate, the optical signal processor disclosed in the above-mentioned publication rotates the polarization direction of light by 90 degrees between the first and second diffracting actions caused by the diffraction grating device, thereby lowering the dependence on polarization.

SUMMARY OF THE INVENTION

The inventor studied the conventional technique mentioned above and, as a result, has found the following problem. Namely, for sufficiently lowering the dependence on polarization, it is necessary for the optical signal processor disclosed in the above-mentioned publication to set the direction of the optic axis of the half-wave plate strictly. The direction of the optic axis of the half-wave plate is adjusted while monitoring input/output characteristics of the optical signal processor. On the other hand, the optical signal processor is required to be as small as possible. Therefore, the direction of the optic axis of the half-wave plate arranged in a narrow space within the optical signal processor is hard to adjust accurately. Hence, it is hard to realize a small-size optical signal processor whose dependence on polarization is lowered.

For overcoming the above-mentioned problem, it is an object of the present invention to provide an optical signal processor which can easily lower the dependence on polarization even when it has a small size.

The optical signal processor in accordance with the present invention comprises (1) a first diffraction grating device for diffracting light inputted; (2) a second diffraction grating device for diffracting the light diffracted by the first diffraction grating device; and (3) first and second half-wave plates, disposed on an optical path between the first and second diffraction grating devices, having respective optic axes in directions different from each other by 45 degrees.

The light fed into the optical signal processor is diffracted by the first diffraction grating device and then, with its polarization direction rotated by the first and second half-wave plates, is diffracted again by the second diffraction grating device. The first and second half-wave plates have respective optic axis directions different from each other by 45 degrees, and can rotate the polarization direction of incident light by 90 degrees regardless of their individual optic axis directions and then emit thus rotated light.

Here, the first and second diffraction grating devices are preferably arranged parallel to each other. As a consequence, the respective optical axes of individual signal light components diffracted by the second diffraction grating device become parallel to each other, which facilitates subsequent signal processing operations such as connection to a fiber.

Preferably, the first and second half-wave plates are arranged orthogonal to an optical axis of light having a center wavelength in a wavelength band in use. This optimizes the lowering of dependence on polarization in the wavelength band in use.

Preferably, a mirror is disposed on the optical path between the first and second diffraction grating devices, whereas the first and second half-wave plates are disposed on an optical path between the first diffraction grating device and the mirror, or on an optical path between the second diffraction grating device and the mirror. As a consequence, the light fed into the optical signal processor is diffracted by the first diffraction grating device and then, with its polarization direction rotated by the first and second half-wave plates, is reflected by the mirror. Thus reflected light is diffracted again by the second diffraction grating device. Alternatively, the light fed into the optical signal processor is diffracted by the first diffraction grating device, and then is reflected by the mirror. Thereafter, with its polarization direction rotated by the first and second half-wave plates, the reflected light is diffracted again by the second diffraction grating device.

Here, the mirror is preferably arranged parallel to the first or second diffraction grating device. As a consequence, the respective optical axes of individual signal light components diffracted by the second diffraction grating device become parallel, which facilitates subsequent signal processing operations such as connection to a fiber.

Preferably, the first and second diffraction grating devices are integrated with each other. This facilitates adjustment at the time of assembling.

Preferably, the first and second diffraction grating devices have the same grating direction. This enhances diffraction efficiency.

The present invention will become more fully understood from the detailed description given hereinbelow and the accompanying drawings. They are given by way of illustration only, and thus should not be considered limitative of the present invention.

DETAILED DESCRIPTION OF THE PREFERRED EMBODIMENTS

In the following, embodiments of the present invention will be explained in detail with reference to the accompanying drawings. In the explanation of the drawings, constituents identical to each other will be referred to with numerals identical to each other without repeating their overlapping descriptions.

First, the principle of the present invention will be explained. It is assumed in an xyz orthogonal coordinate system that a wave plate is disposed parallel to the xy plane and that light advances parallel to the z axis. It is also assumed that the wave plate has an optic axis, located on a plane parallel to the xy plane, in a direction forming an angle $\theta$ with respect to the y axis. Let $E_{0x}$ be the polarized light component in the x-axis direction of light advancing in the z-axis direction so as to be made incident on the wave plate, and $E_{0y}$ be the polarized light component in the y-axis direction thereof. Let $E_{1x}$ be the polarized light component in the x-axis direction of the light emitted from the wave plate, and $E_{1y}$ be the polarized light component in the y-axis direction thereof.

Then, the relational expression of $$\begin{pmatrix} E_{1x} \\ E_{1y} \end{pmatrix} = J(\theta, \varphi) \begin{pmatrix} E_{0x} \\ E_{0y} \end{pmatrix} \qquad (1)$$

holds between the incident light ($E_{0x}$, $E_{0x}$) and the emitted light ($E_{1x}$, $E_{1x}$). Here, the matrix $J(\theta, \varphi)$ is a Jones matrix indicating input/output characteristics of light in the wave plate, and is represented by the expression of $$J(\theta, \varphi) = \begin{pmatrix} \cos\theta & \sin\theta \\ -\sin\theta & \cos\theta \end{pmatrix} \begin{pmatrix} e^{-j\frac{\varphi}{2}} & 0 \\ 0 & e^{j\frac{\varphi}{2}} \end{pmatrix} \begin{pmatrix} \cos\theta & -\sin\theta \\ \sin\theta & \cos\theta \end{pmatrix}. \qquad (2)$$

Here, j is an imaginary unit. $\varphi$ is a phase difference occurring when light having respective polarized light components in x and y directions passes through the wave plate. $\varphi=\pi$ in the case of a half-wave plate.

In the optical signal processor disclosed in the publication listed in the background art section, a half-wave plate in which $\varphi=\pi/4$ and $\varphi=\pi$ is used. The Jones matrix $J(\pi/4, \pi)$ of this half-wave plate is represented by the expression of $$J\left(\frac{\pi}{4}, \pi\right) = \begin{pmatrix} 0 & j \\ j & 0 \end{pmatrix}. \qquad (3)$$

This expression means that the half-wave plate can rotate the polarization direction of incident light by 90 degrees and emit thus rotated light.

In general, the Jones matrix of the half-wave plate is given when $\varphi=\pi$ in the above-mentioned expression, so as to be represented by the expression of $$J(\theta, \pi) = \begin{pmatrix} j(\sin^2\theta - \cos^2\theta) & 2j\cos\theta\sin\theta \\ 2j\cos\theta\sin\theta & j(\cos^2\theta - \sin^2\theta) \end{pmatrix}. \qquad (4)$$

As can be seen from this expression, the Jones matrix of the half-wave plate depends on the angle $\theta$. Hence, for sufficiently lowering the dependence on polarization, the optical signal processor disclosed in the publication listed in the background art section is required to set the direction of the optic axis of the half-wave plate strictly.

Therefore, the present invention uses two half-wave plates in combination. The optic axis of the first half-wave plate is assumed to form the angle $\theta$ with respect to the y axis. The optic axis of the second half-wave plate is assumed to form the angle $(\theta+\pi/4)$ with respect to the y axis. The Jones matrix of the first half-wave plate is given by the above-mentioned expression (4), whereas the Jones matrix of the second half-wave plate is represented by the expression of $$J\left(\theta + \frac{\pi}{4}, \pi\right) = \begin{pmatrix} 2j\cos\theta\sin\theta & j(\cos^2\theta - \sin^2\theta) \\ j(\cos^2\theta - \sin^2\theta) & -2j\cos\theta\sin\theta \end{pmatrix}. \qquad (5)$$

The total Jones matrix of the first and second half-wave plates is given by the product of the above-mentioned expressions (4) and (5), and is represented by the expression of $$J\left(\theta + \frac{\pi}{4}, \pi\right) \cdot J(\theta, \pi) = \begin{pmatrix} 0 & -1 \\ 1 & 0 \end{pmatrix}. \quad (6)$$

As can be seen from this expression, the combination of the first and second half-wave plates can rotate the polarization direction of incident light by 90 degrees and emit thus rotated light independently of the θ value. Namely, the combination of the first and second half-wave plates having respective optic axes in directions different from each other by 45 degrees can simply rotate the polarization direction of incident light by 90 degrees and output thus rotated light.

The optical signal processor in accordance with the present invention is based on the foregoing principle, and uses two half-wave plates in combination.

First Embodiment

Figure 1:
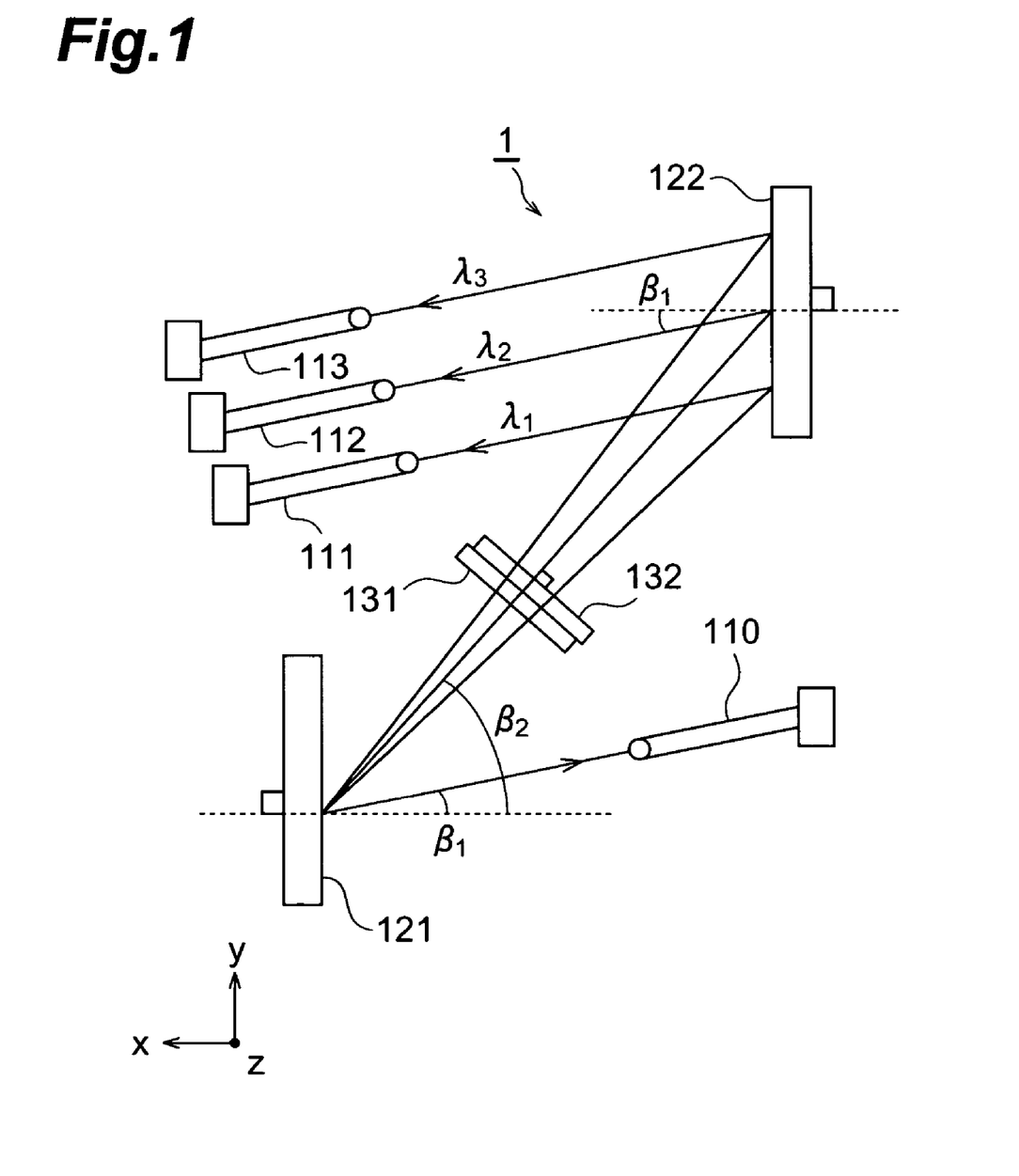
FIG. 1 is a schematic diagram of the optical signal processor in accordance with a first embodiment.

A first embodiment of the optical signal processor in accordance with the present invention will now be explained. FIG. 1 is a schematic diagram of the optical signal processor 1 in accordance with the first embodiment. The optical signal processor 1 shown in this diagram comprises fiber collimators 110 to 113, a first diffraction grating device 121, a second diffraction grating device 122, a first half-wave plate 131, and a second half-wave plate 132. For convenience of explanation, an xyz orthogonal coordinate system is also shown in this diagram. Light is assumed to advance in parallel with the xy plane in the optical signal processor 1.

Each of the fiber collimators 110 to 113 comprises an optical fiber with a spherically processed leading end part or an optical fiber with a leading end connected to a lens, and has a collimating function. Each of the fiber collimators 110 to 113 can collimate the light having arrived at the leading end of the optical fiber after propagating therethrough and output thus collimated light, or converge the light having arrived at the leading end from the outside and propagate thus converged light through the optical fiber.

The diffraction grating device 121 is of reflection type, and has a diffracting surface parallel to the yz plane and a grating direction parallel to the z axis. When the light outputted from the collimator 110 after collimation is incident, the diffraction grating device 121 diffracts the light at a diffraction angle corresponding to the wavelength. Letting d be the grating constant of the diffraction grating device 121, $\beta_1$ be the incident angle of light, and $\beta_2$ be the diffraction angle of light having a wavelength λ, the relationship of $$m\lambda = d(\sin \beta_1 + \sin \beta_2) \quad (7)$$

holds among these angles. Here, m is the order of diffraction.

The diffraction grating device 122 is of reflection type having a diffracting surface parallel to the yz plane and a grating direction parallel to the z axis. The diffraction grating devices 121, 122 have respective diffracting surfaces opposing each other. The diffraction grating device 122 has the same grating constant d as with the diffraction grating device 121. The diffraction grating device 122 diffracts the light diffracted by the diffraction grating device 121. Here, the incident angle of light having the wavelength λ onto the diffraction grating device 122 is $\beta_2$, whereas the diffraction angle of light in the diffraction grating device 122 is $\beta_1$ regardless of the wavelength λ. Namely, the individual wavelength light components diffracted by the diffraction grating device 122 advance in parallel with each other.

The fiber collimator 111 converges and inputs the light having a wavelength $\lambda_1$ diffracted by the diffraction grating device 122. The fiber collimator 112 converges and inputs the light having a wavelength $\lambda_2$ diffracted by the diffraction grating device 122. The fiber collimator 113 converges and inputs the light having a wavelength $\lambda_3$ diffracted by the diffraction grating device 122. When light advances as in the foregoing, the optical signal processor 1 is used as an optical demultiplexer which inputs light outputted from the fiber collimator 110, demultiplexes thus inputted light, and outputs thus demultiplexed individual wavelength light components into any of the fiber collimators 111 to 113. When light advances in the opposite direction, the optical signal processor 1 is used as an optical multiplexer which inputs respective wavelength light components outputted from the fiber collimators 111 to 113, multiplexes thus inputted light components, and outputs thus multiplexed light to the fiber collimator 110.

The two half-wave plates 131, 132, which have respective optic axes in directions different from each other by 45 degrees, are bonded together and disposed on the optical path between the diffraction grating devices 121 and 122. The combination of the two half-wave plates 131, 132 has a total Jones matrix represented by the above-mentioned expression (6), and can rotate the polarization direction of incident light by 90 degrees and emit thus rotated light.

Therefore, if the two half-wave plates 131, 132 are set so that their optic axes are in respective directions different from each other by 45 degrees, the small-size optical signal processor 1 can easily be assembled by using them. At the time of assembling, the respective optic axes of the half-wave plates 131, 132 may be in any directions, whereby the optical signal processor 1 can easily lower its dependence on polarization even when it has a small size.

The diffraction grating devices 121, 122 are arranged parallel to each other. The half-wave plates 131, 132 are arranged orthogonal to the optical axis of the center wavelength of the wavelength band ($\lambda_1$ to $\lambda_3$) of light to be processed by the optical signal processor 1. Such an arrangement can lower the dependence of the optical signal processor 1 on polarization more fully.

Figure 2A:
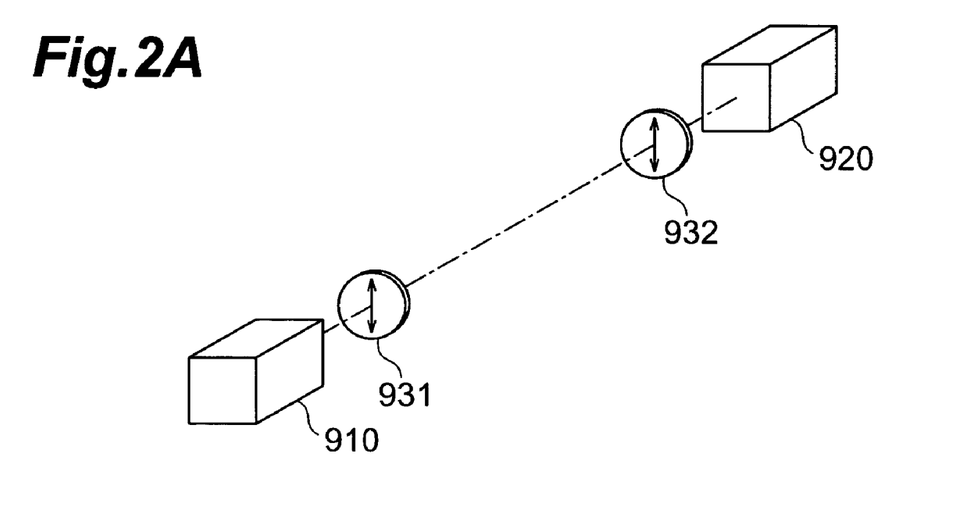
FIGS. 2A and 2B are explanatory views of a method of adjusting the optic axes of half-wave plates in the optical signal processor in accordance with the first embodiment.
Figure 2B:
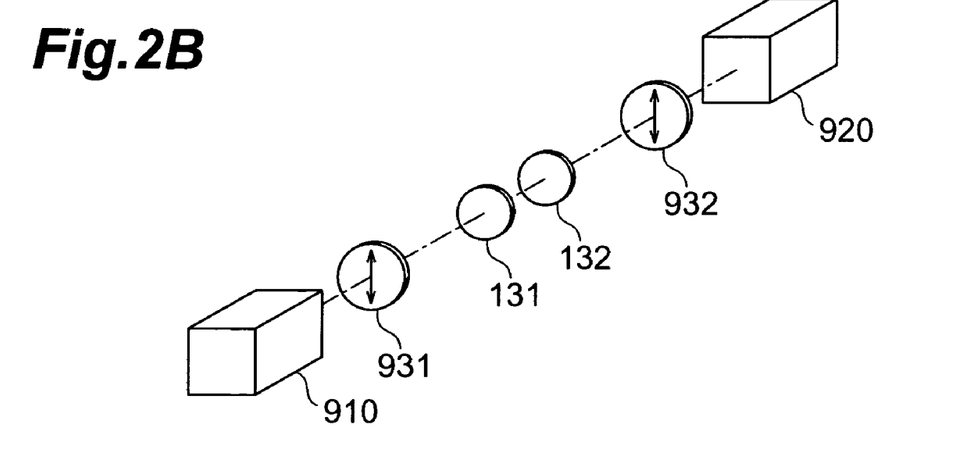

FIGS. 2A and 2B are explanatory views of a method of adjusting the optic axes of the half-wave plates 131, 132 in the optical signal processor 1 in accordance with the first embodiment. As shown in FIG. 2A, a light source 910, a power meter 920, and polarizers 931, 932 are prepared. The light source 910 and the optical power meter 920 are arranged such that the light outputted from the former can be received by the latter, whereas the polarizers 931, 932 are disposed on the optical path between the light source 910 and the power meter 920. Then, one of the polarizers 931, 932 is rotated about the optical axis, so as to be adjusted such that the light received by the power meter 920 attains the maximum power. As a consequence, the respective optic axis directions of the polarizers 931, 932 are set parallel to each other. The arrows in the polarizers in the drawing indicate the optic axis directions of the polarizers.

Subsequently, as shown in FIG. 2B, the half-wave plates 131, 132 are disposed on the optical path between the polarizers 931, 932. Then, one of the half-wave plates 131, 132 is rotated about the optical axis, so as to be adjusted such that the light received by the power meter 920 attains the minimum power. As a consequence, the half-wave plates 131, 132 are set so as to have respective optic axis directions different from each other by 45 degrees.

The half-wave plates 131, 132 having set their respective optic axis directions as such are bonded together, and the resulting product is used for assembling the optical signal processor 1, whereby the small-size optical signal processor 1 having reduced the dependence on polarization can be assembled easily. If the optical system shown in FIG. 2A is prepared beforehand, the optic axes of the half-wave plates 131, 132 can be adjusted in a step different from the step of assembling the optical signal processor 1, which is excellent in terms of mass productivity.

Figure 3:
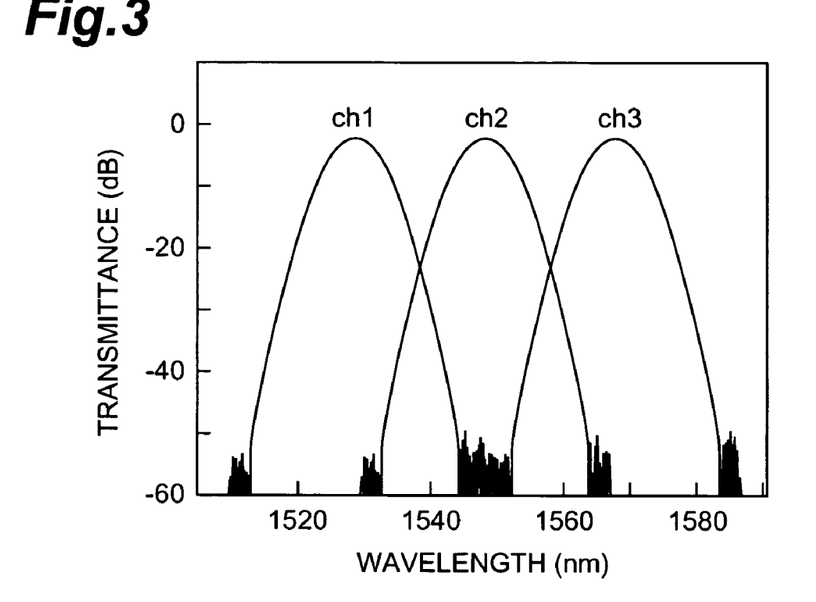
FIG. 3 is a chart showing demultiplexing characteristics of the optical signal processor in accordance with an example.
Figure 4:
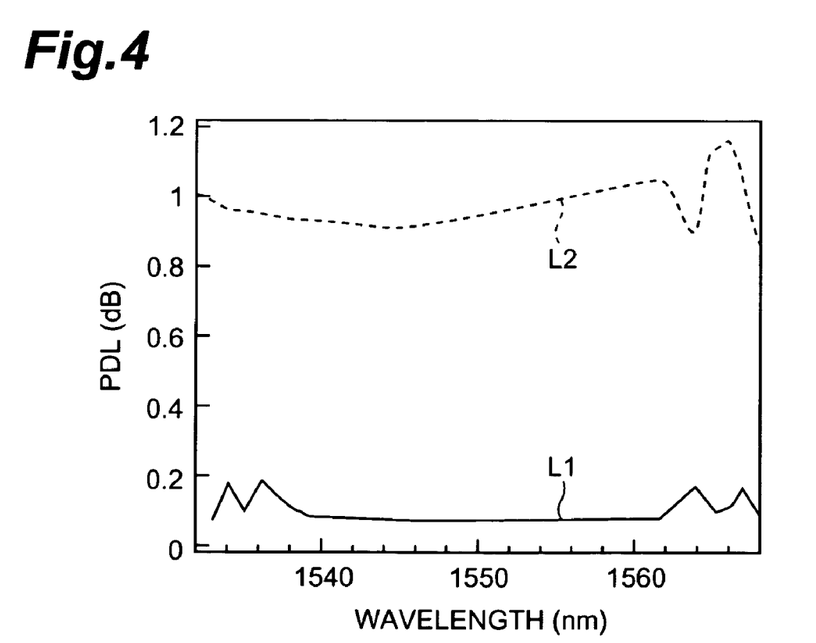
FIG. 4 is a chart showing polarization-dependent loss of the optical signal processor in accordance with the example.
Figure 5:
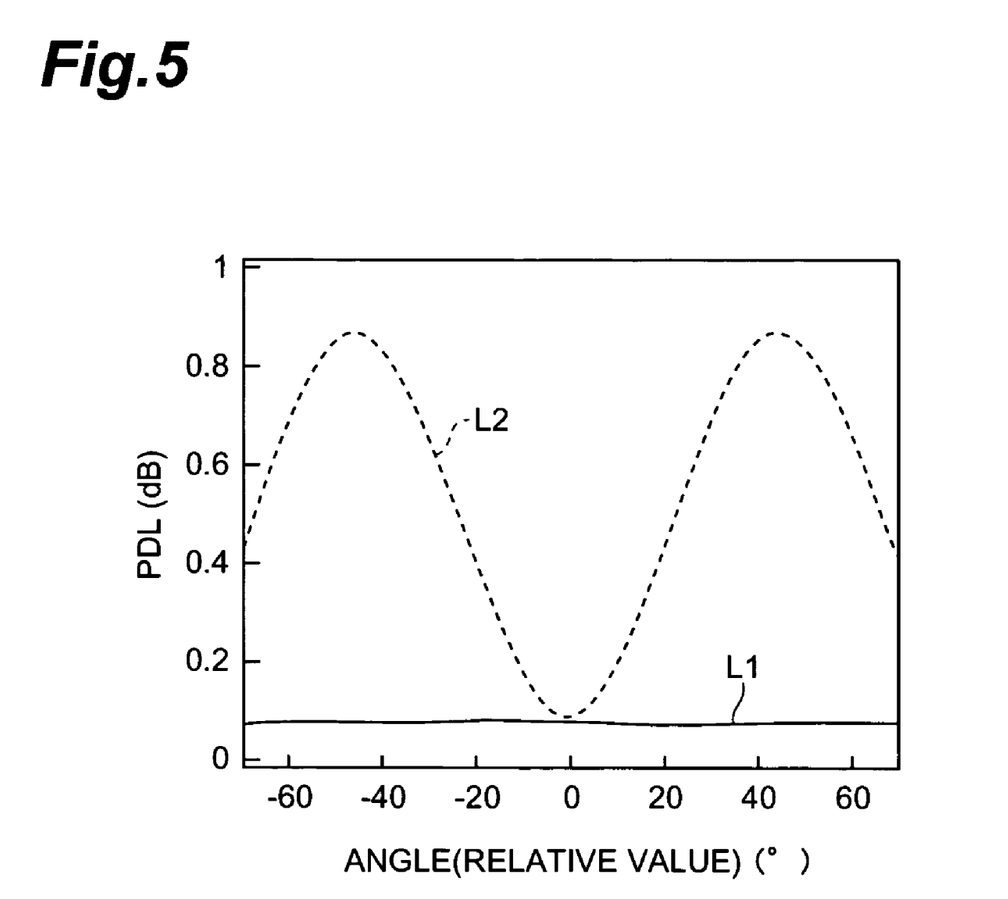
FIG. 5 is a chart showing the relationship between the polarization-dependent loss and the optic axis direction of a half-wave plate in the optical signal processor in accordance with the example.

A specific example of the optical signal processor 1 in accordance with the first embodiment will now be explained. In this example, each of the diffraction grating devices 121, 122 has a grating constant of 1.7 μm, whereas wavelengths of light to be processed are 1530 nm, 1550 nm, and 1570 nm. The incident angle $\beta_1$ of light from the fiber collimator 110 onto the diffraction grating device 121 is 15 degrees, whereas the diffraction angle $\beta_2$ of light having a center wavelength of 1550 nm in the first diffraction grating device 121 is 40.8 degrees. Each of the half-wave plates 131, 132 is arranged orthogonal to the optical axis of the light having the center wavelength of 1550 nm from the first diffraction grating device 121 to the second diffraction grating device 122. FIGS. 3 to 5 show various characteristics of the optical signal processor in accordance with the example.

FIG. 3 is a chart showing demultiplexing characteristics of the optical signal processor in accordance with the example. This chart shows the transmission characteristic of light from the fiber collimator 110 to the fiber collimator 111, the transmission characteristic of light from the fiber collimator 110 to the fiber collimator 112, and the transmission characteristic of light from the fiber collimator 110 to the fiber collimator 113. As shown in this chart, the light emitted from the fiber collimator 110 to the diffraction grating device 121 is diffracted by the diffraction grating devices 121, 122 at respective diffraction angles corresponding to wavelengths, so as to be demultiplexed. Then, light components having wavelengths of 1530 nm, 1550 nm, and 1570 nm are made incident on the fiber collimators 111, 112, and 113, respectively.

FIG. 4 is a chart showing polarization-dependent loss (PDL) of the optical signal processor in accordance with the example (indicated by L1). This chart also shows polarization-dependent loss of a comparative example without the half-wave plates 131, 132 (indicated by L2). In each of the example and comparative example, the polarization-dependent loss of light from the fiber collimator 110 to the fiber collimator 112 is shown. As can be seen from this chart, since the optical signal processor in accordance with the example is provided with two half-wave plates 131, 132 having respective optic axis directions different from each other by 45 degrees, its polarization-dependent loss is improved by about 0.8 dB over the comparative example.

FIG. 5 is a chart showing the relationship between the polarization-dependent loss and the optic axis direction of a half-wave plate in the optical signal processor in accordance with the example (indicated by L1). This chart also shows the case of a comparative example (indicated by L2) in which only one half-wave plate is disposed between the diffraction grating devices 121, 122. In each of the example and comparative example, the polarization-dependent loss of light having a wavelength of 1550 nm from the fiber collimator 110 to the fiber collimator 112 is shown with respect to the angle of rotation of the half-wave plate about the optical axis. As can be seen from this chart, the range of fluctuation in polarization-dependent loss when rotating the half-wave plate about the optical axis is very small in the example, while it is about 0.8 dB in the comparative example. Thus, since the half-wave plates 131, 132 set with respective optic axis directions different from each other by 45 degrees are used, this embodiment can make it easy to assemble the optical signal processor 1 having a small size with reduced polarization-dependent loss.

Second Embodiment

Figure 6:
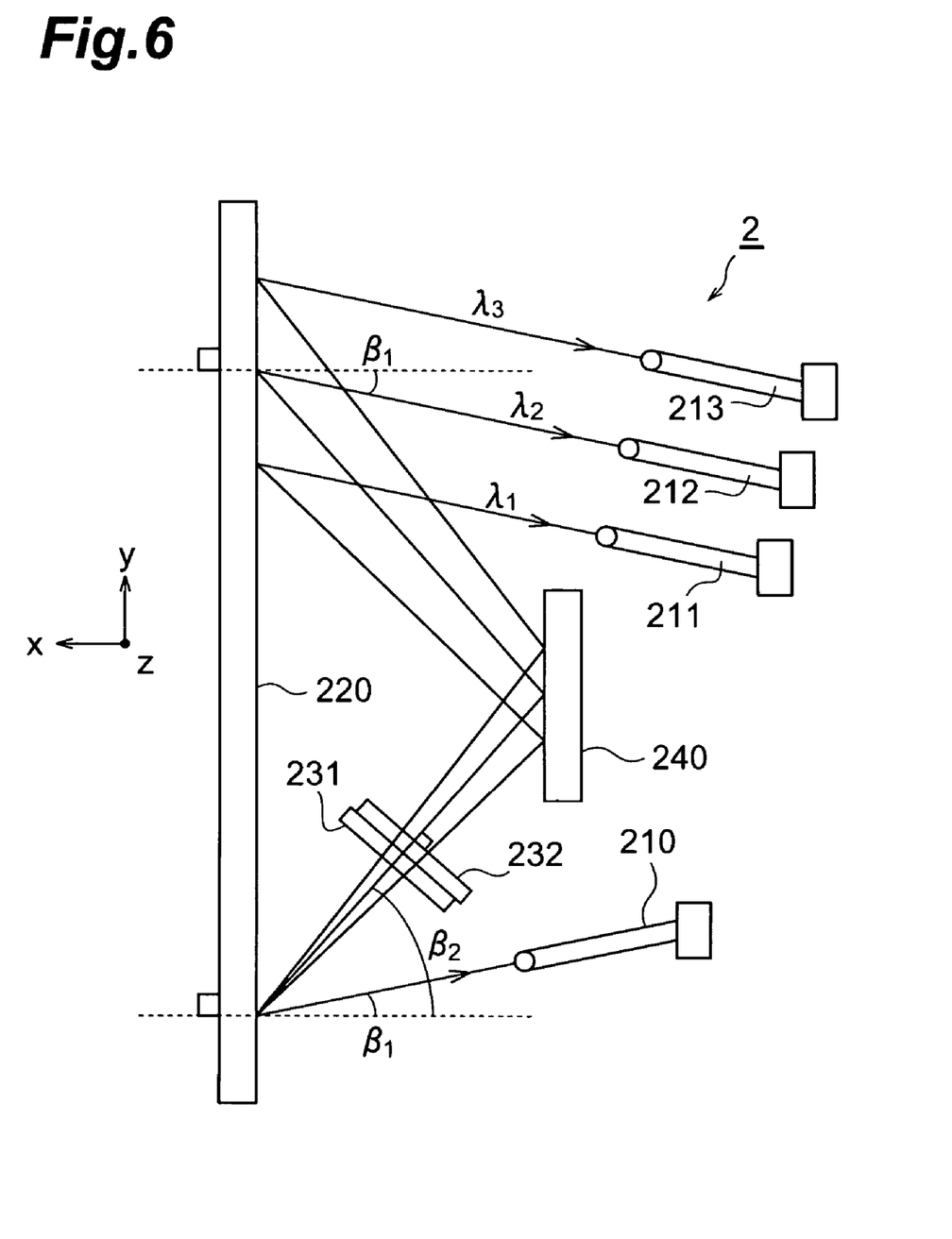
FIG. 6 is a schematic diagram of the optical signal processor in accordance with a second embodiment.

A second embodiment of the optical signal processor in accordance with the present invention will now be explained. FIG. 6 is a schematic diagram of the optical signal processor 2 in accordance with the second embodiment. The optical signal processor 2 shown in this diagram comprises fiber collimators 210 to 213, a diffraction grating device 220, a first half-wave plate 231, a second half-wave plate 232, and a mirror 240. For convenience of explanation, this diagram also shows an xyz orthogonal coordinate system. It is assumed in the optical signal processor 2 that light advances in parallel with the xy plane.

Each of the fiber collimators 210 to 213 comprises an optical fiber with its leading end processed into a spherical form, so as to exhibit a collimator function. Each fiber collimator can collimate the light having arrived at the leading end of the optical fiber after propagating therethrough and output thus collimated light, or converge the light having arrived at the leading end from the outside and propagate thus converged light through the optical fiber.

The diffraction grating device 220 is of reflection type, and has a diffracting surface parallel to the yz plane and a grating direction parallel to the z axis. When the light outputted from the fiber collimator 210 after collimation is incident, the diffraction grating device 220 diffracts the light at a diffraction angle corresponding to the wavelength. When the light reflected by the mirror 240 is incident, the diffraction grating device 220 diffracts the light as well. Namely, the diffraction grating device 220 is one in which the first and second diffraction grating devices are integrated with each other.

The reflecting surface of the mirror 240 opposes the diffracting surface of the diffraction grating device 220 and is parallel to the diffraction grating device 220. The light diffracted by the diffraction grating device 220 is made incident on and reflected by the mirror 240, so as to be made incident on the diffraction grating device 220 again.

Letting d be the grating constant of the diffraction grating device 220, $\beta_1$ be the incident angle of light from the fiber collimator 210 onto the diffraction grating device 220, and $\beta_2$ be the diffraction angle of light having a wavelength λ at this time, the above-mentioned expression (7) holds among these angles. Also, the incident angle of light from the mirror 240 onto the diffraction grating device 220 is $\beta_2$, whereas the diffraction angle of light at this time is $\beta_1$ regardless of the wavelength λ. Namely, the individual wavelength light components diffracted twice by the diffraction grating device 220 advance in parallel with each other.

The fiber collimator 211 converges and inputs light having a wavelength $\lambda_1$ diffracted twice by the diffraction grating device 220. The fiber collimator 212 converges and inputs light having a wavelength $\lambda_2$ diffracted twice by the diffraction grating device 220. The fiber collimator 213 converges and inputs light having a wavelength $\lambda_3$ diffracted twice by the diffraction grating device 220. When light advances as in the foregoing, the optical signal processor 2 is used as an optical demultiplexer which inputs light outputted from the fiber collimator 210, demultiplexes thus inputted light, and outputs thus demultiplexed individual signal light components into any of the fiber collimators 211 to 213. When light advances in the opposite direction, the optical signal processor 2 is used as an optical multiplexer which inputs individual wavelength light components outputted from the fiber collimators 211 to 213, multiplexes thus inputted light components, and outputs thus multiplexed light to the fiber collimator 210.

The two half-wave plates 231, 232, which have respective optic axes in directions different from each other by 45 degrees, are bonded together and are disposed on the optical path between the diffraction grating device 220 and the mirror 240. The combination of the two half-wave plates 231, 232 has a total Jones matrix represented by the above-mentioned expression (6), and can rotate the polarization direction of incident light by 90 degrees and emit thus rotated light. The half-wave plates 231, 232 may be disposed on the optical path from the first diffracting action by the diffraction grating device 220 to the reflection by the mirror 240, or on the optical path from the reflection by the mirror 240 to the second diffracting action by the diffraction grating device 220.

Therefore, if the two half-wave plates 231, 232 are set so as to have respective optic axis directions different from each other by 45 degrees, the small-size optical signal processor 2 can be assembled easily by using them. At the time of assembling, the respective optic axes of the half-wave plates 231, 232 may be in any directions, whereby the optical signal processor 2 can easily lower its dependence on polarization even when it has a small size.

The half-wave plates 231, 232 are arranged parallel to each other. Further, each of the half-wave plates 231, 232 is arranged orthogonal to the optical axis of the center wavelength of the wavelength band ($\lambda_1$ to $\lambda_3$) of light to be processed by the optical signal processor 2. Such an arrangement can lower the dependence of the optical signal processor 2 on polarization more fully.

Without being restricted by the above-mentioned embodiments, the present invention can be modified in various manners. For example, though each of the optical signal processor in accordance with the above-mentioned embodiments comprises a reflection type diffraction grating device, they may be provided with transmission type diffraction grating devices.

Though the respective diffracting surfaces of the diffraction grating devices 121, 122 are parallel to each other in the first embodiment, the diffracting surfaces may not be parallel to each other. Though the diffracting surface of the diffraction grating device 220 and the reflecting surface of the mirror 240 are parallel to each other in the second embodiment, these surfaces may not be parallel to each other. When they are not parallel to each other, the wavelength gap can be expanded.

Figure 7A:
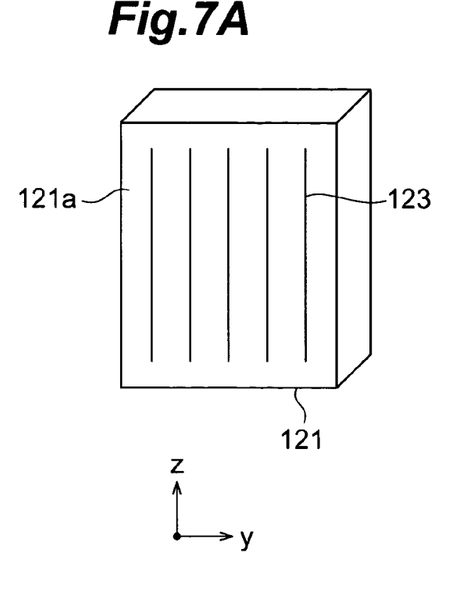
FIGS. 7A and 7B are views showing the case where grating directions are same between two diffraction grating devices.
Figure 7B:
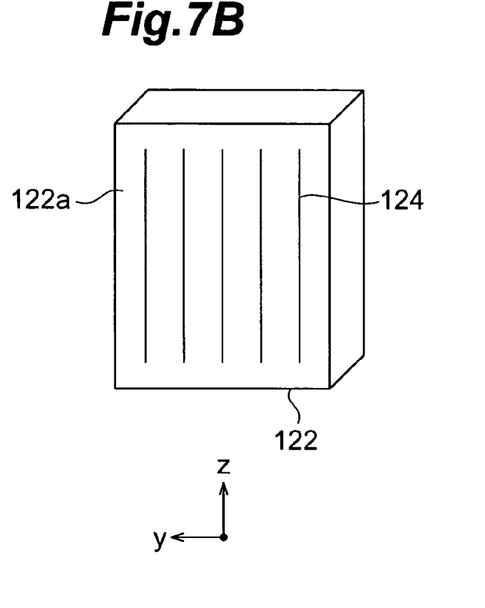
Figure 8A:
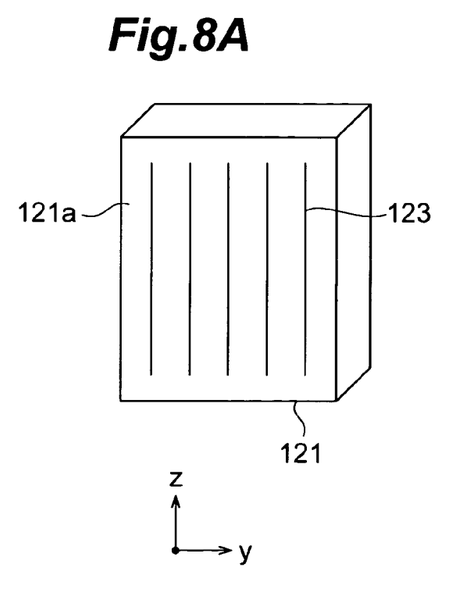
FIGS. 8A and 8B are views showing the case where grating directions are different between two diffraction grating devices.
Figure 8B:
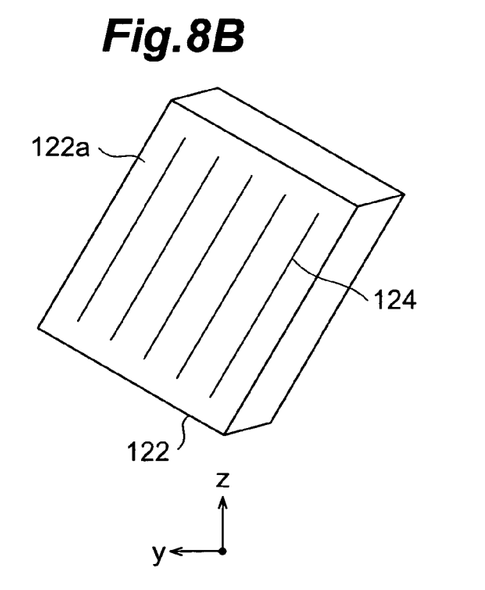

Though the grating directions of the gratings 123, 124 provided on diffracting surfaces 121a, 122a are same between diffraction grating devices 121, 122 and both parallel to the z axis as shown in FIGS. 7A and 7B, the grating directions of the gratings 123, 124 may be different from each other as shown in FIGS. 8A and 8B. However, the first and second diffraction grating devices preferably have the same grating direction. This enhances diffraction efficiency.

As is described in detail, the present invention can easily assemble a small-size optical signal processor by using two half-wave plates. At the time of assembling, the respective optic axes of two half-wave plates may be in any directions, whereby the optical signal processor can easily lower its dependence on polarization even when it has a small size.

It is apparent from the above description of the present invention that the present invention can be modified in various ways. Such modifications are embraced in the present invention without departing from the spirit and scope of the present invention and all improvements obvious to those skilled in the art are included in the scope of the claims which follow.

What is claimed is:

1. An optical signal processor comprising:
   a first diffraction grating device for diffracting incident light, the first diffraction grating having a diffracting surface arranged on a first reference plane;
   a second diffraction grating device for diffracting the light diffracted by the first diffraction grating device, the second diffraction grating device having a diffracting surface arranged on a second reference plane apart from and parallel to the first reference plane; and
   first and second half-wave plates, disposed on an optical path between the first and second diffraction grating devices, having their respective optical axes disposed at an angle of 45 degrees from each other.

2. An optical signal processor according to claim 1, wherein the first and second half-wave plates are arranged orthogonal to an optical axis of light having a center wavelength in a wavelength band in use.

3. An optical signal processor according to claim 1, wherein the first and second diffraction grating devices have the same grating direction.

4. An optical signal processor according to claim 1, wherein each of the first and second diffraction grating devices is a reflection type diffraction grating device.

5. An optical signal processor according to claim 1, wherein each of the first and second diffraction grating devices is a transmission type diffraction grating device.

6. An optical signal comprising:
   a first diffraction grating device for diffracting incident light, the first diffraction grating device having a diffracting surface arranged on a first reference plane;
   a second diffraction grating device for diffracting the light diffracted by the first diffraction grating device, the second diffraction grating device having a diffracting surface arranged on the first reference plane;
   a mirror disposed on an optical path between the first and second diffraction grating devices, the mirror having a reflecting surface arranged on a second reference plane apart from and parallel to the first reference plane; and
   first and second half-wave plates, disposed on an optical path between the first diffraction grating device and the mirror, or on an optical path between the second diffraction grating device and the mirror, having their respective optical axes disposed at an angle of 45 degrees from each other.

7. An optical signal processor according to claim 6, wherein the first and second diffraction grating devices are integrated with each other.

8. An optical signal processor according to claim 6, wherein the first and second diffraction grating devices have the same grating direction.

9. An optical signal processor according to claim 6, wherein each of the first and second diffraction grating devices is a reflection type diffraction grating device.

10. An optical signal processor according to claim 6, wherein each of the first and second diffraction grating devices is a transmission type diffraction grating device.

* * * * *